E. D. SMITH.
SPRING WHEEL.
APPLICATION FILED MAR. 15, 1913.
1,073,368.
Patented Sept. 16, 1913.
2 SHEETS—SHEET 1.
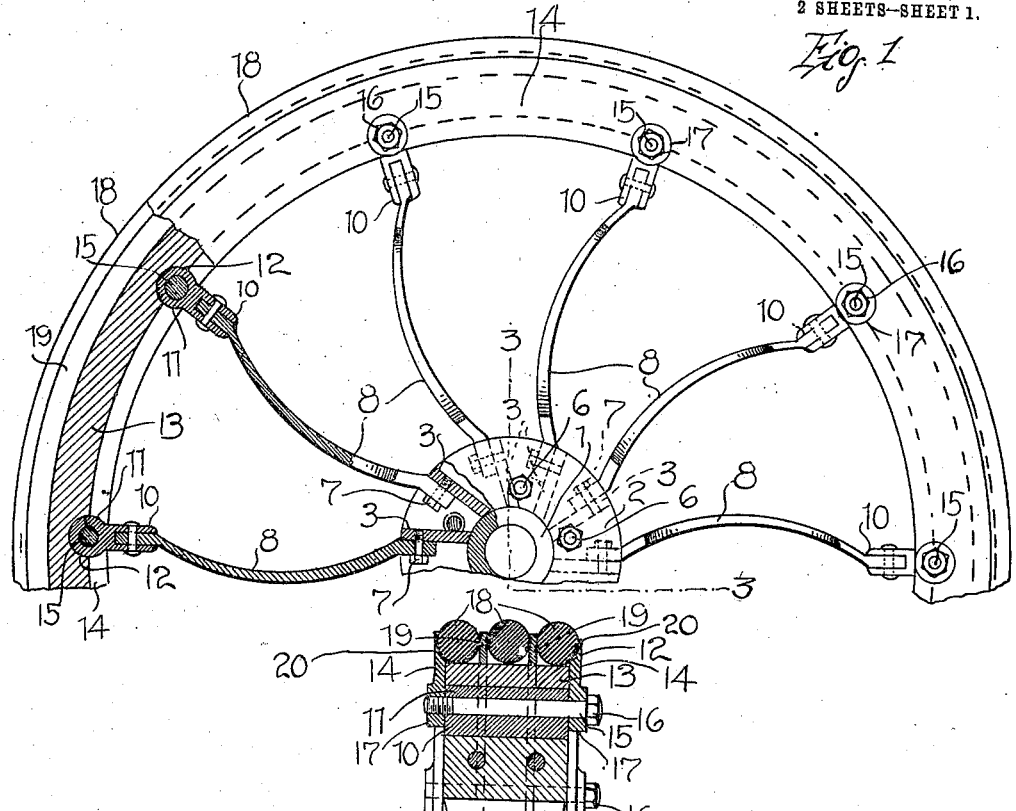
Fig. 1
Fig. 2
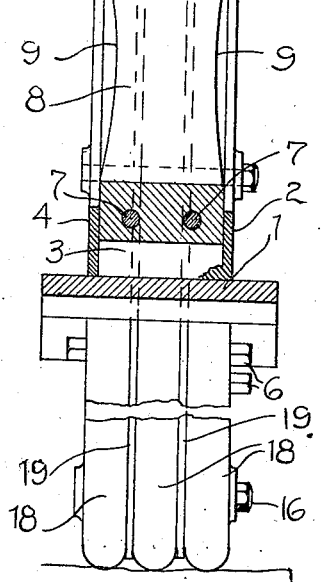
Witnesses
Robert M. Shepherd
A. L. Hind
Inventor
E. D. Smith
By Watson E. Coleman
Attorney E. D. SMITH.
SPRING WHEEL.
APPLICATION FILED MAR. 15, 1913.
1,073,368.
Patented Sept. 16, 1913.
2 SHEETS—SHEET 2.
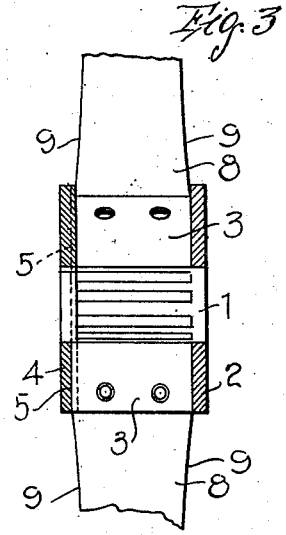
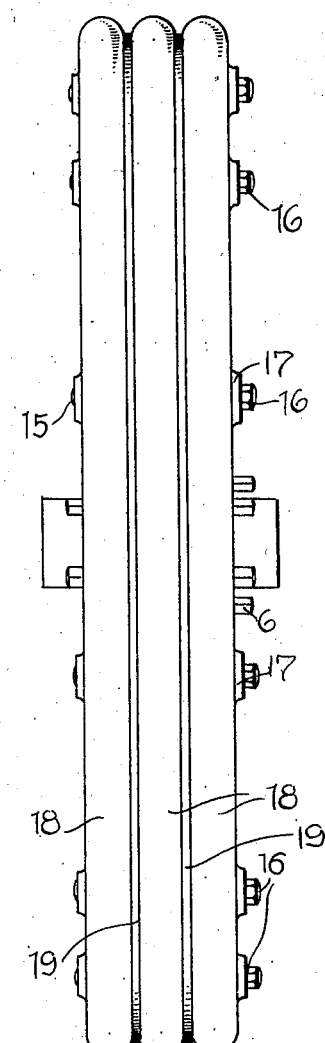
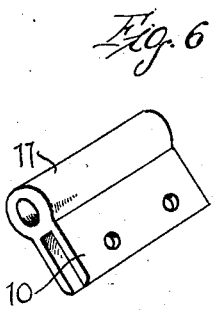
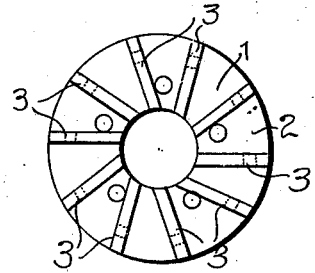
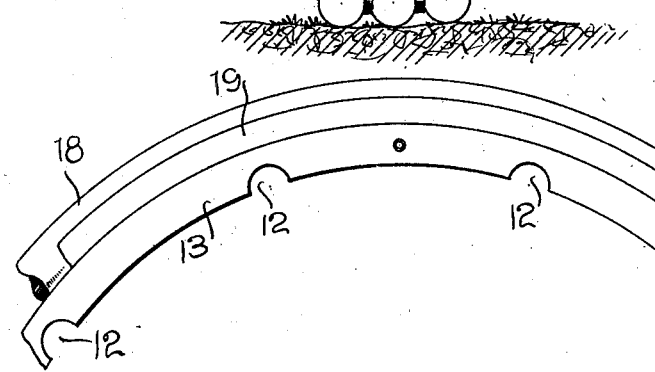
Inventor
E. D. SMITH
Witnesses
Robert M. Sutphen
A. D. Hind
By Watson E. Coleman
Attorney

UNITED STATES PATENT OFFICE.

EDGAR D. SMITH, OF ELIZABETH, NEW JERSEY.

SPRING-WHEEL.

1,073,368.  Specification of Letters Patent.  Patented Sept. 16, 1913.

Application filed March 15, 1913. Serial No. 754,623.

*To all whom it may concern:*

Be it known that I, EDGAR D. SMITH, a citizen of the United States, residing at Elizabeth, in the county of Union and State of New Jersey, have invented certain new and useful Improvements in Spring-Wheels, of which the following is a specification, reference being had to the accompanying drawings.

This invention relates to new and useful improvements in resilient wheels and more particularly to a spring wheel for special use on automobiles and my object is to provide a wheel of this character, the resiliency of which will be equal to, if not greater than, the resiliency afforded by the ordinary pneumatic tire.

A further object of the invention resides in providing an improved spring spoke structure and a still further object resides in providing a device which is adapted to supersede the various forms of resilient wheels now in use.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a fragmentary side elevation of a wheel with parts in section. Fig. 2 is a plan view thereof, partly in section. Fig. 3 is a transverse section as seen on line 3—3, Fig. 1. Fig. 4 is a detail plan view of the hub member removed. Fig. 5 is a front elevation of the wheel complete. Fig. 6 is a perspective view of one of the yoke members used for securing the outer ends of the spring spokes; and Fig. 7 is a fragmentary side elevation of the rim of the wheel with the tire members applied thereto.

In describing my invention, I shall refer to the drawings in which similar reference characters designate corresponding parts throughout the several views and in which a hub is provided, consisting of a central sleeve-like core 1, having the end disk or annulus 2 formed at one end thereof. Also formed integral with the inner face of the end disk 2 and the outer periphery of the sleeve-like core 1, are the substantially radial plate-like members 3 and an opposite or separable end disk 4 is provided, the same having grooves or slots 5 on the inner face thereof to receive therein the free end edges of the plate-like members 3. Bolts 6 extending transversely through the end disks or plates 2 and 4, secure said hub in its set up form. Secured to the face of each of said plate-like members 3, by means of the bolts or the like 7, is the inner end of a bowed spring spoke 8. These bowed spring spokes have the side edges thereof concaved as shown at 9 and the same are tapered in thickness somewhat at the latter portions toward the outer ends of the same, as clearly shown in Fig. 1 of the drawings.

The outer ends of the bowed spring spokes 8 are received in the slotted portions or the like of the substantial yoke members 10, the same being riveted or otherwise similarly secured thereto and these yoke members, each of which is provided with a sleeve-like portion 11, are received in the transverse grooves or notches 12 which are formed in the inner periphery of a rim 13. A pair of retaining bands 14 disposed on opposite sides of the rim 13 and yoke members 10, are adapted to be held in position by means of bolts 15 which are disposed through openings in said bands and through the sleeve-like portions 11 of said yoke-like members. These bolts may be held in position in any desired manner, but it is most preferable to have one end thereof threaded into the one side band and the other end threaded and engaged by a nut 16. It must here be also stated that the bands 14 are slightly upset or increased in thickness at the points wherein the openings are provided for the reception of the bolts 15, as shown at 17 and thus a greater bearing surface at this point is provided.

The retaining bands 14 project somewhat beyond the outer peripheral edge of the rim 13 to retain on the latter, a plurality of solid rubber rings 18, the latter forming the tire proper for the device. These rubber tire rings are circular in cross section and are held in spaced relation with one another by means of the spacing rings 19. There may be as many of these solid rubber rings 18 as is found necessary for the width of the rim, but as shown in the drawing, I have only provided three of the same and as the rubber rings 18 project slightly beyond the side edges of the rim 13, the retaining bands 14 are slightly offset as shown at 20 to receive the same snugly therein.

From the foregoing description of the construction of my improved device, the operation thereof will be readily understood and it will be seen that I have provided a simple, inexpensive and efficient device of this character which will be most effective in carrying out the purpose for which the same is designed.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. A spring wheel comprising a hub having a plurality of substantially radial plates formed thereon, a plurality of bowed spring spokes removably secured respectively to the plates on the hub, a plurality of yoke members secured to the outer ends of said spokes, said yoke members being each formed with a sleeve-like portion thereon adapted to be loosely received in engagement with the inner periphery of said rim, a pair of retaining bands applied to the opposite faces of said rim, and means extending through said retaining bands and through the sleeve-like portions of said yoke members to secure the latter and said retaining bands together.

2. A spring wheel comprising a hub having a plurality of substantially radial plates formed thereon, a rim therefor, a plurality of bowed spring members removably secured at their inner ends to the plates of said hub, said rim being provided on its inner periphery with a plurality of transverse notches arranged at regular intervals throughout the periphery thereof, a plurality of yoke members secured to the outer ends of said spring spokes, said yoke members being each formed with a sleeve portion thereon adapted to be loosely received in a notch of the rim, a pair of retaining bands applied to the opposite faces of said rim and receiving said yoke members therebetween, and bolts disposed through the sleeve portions of said yoke members and through said retaining bands to secure the latter and said yoke members together.

In testimony whereof I hereunto affix my signature in the presence of two witnesses.

EDGAR D. SMITH.

Witnesses:
ISAAC F. PHEASANT,
GEORGE E. LENHER.